US008072141B2

(12) United States Patent
Cha et al.

(10) Patent No.: US 8,072,141 B2
(45) Date of Patent: Dec. 6, 2011

(54) EXTERNAL LIGHT SHIELD SHEET AND PLASMA DISPLAY DEVICE USING THE SAME

(75) Inventors: Hong Rae Cha, Seoul (KR); Ji Hoon Sohn, Seoul (KR); Sam Je Cho, Seoul (KR); Woo Sung Jang, Seoul (KR); Woon Seo Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 399 days.

(21) Appl. No.: 11/837,200

(22) Filed: Aug. 10, 2007

(65) Prior Publication Data

US 2008/0042568 A1 Feb. 21, 2008

(30) Foreign Application Priority Data

Aug. 18, 2006 (KR) ........................ 10-2006-0078265

(51) Int. Cl.
*G03B 21/56* (2006.01)
*H01J 61/40* (2006.01)

(52) U.S. Cl. ........... 313/582; 313/586; 313/587; 445/25

(58) Field of Classification Search ........................ None
See application file for complete search history.

(56) References Cited

U.S. PATENT DOCUMENTS

| | | | | |
|---|---|---|---|---|
| 4,509,824 | A * | 4/1985 | Yamasaki et al. | 359/619 |
| 6,657,387 | B1 | 12/2003 | Yoo | |
| 6,822,792 | B2 * | 11/2004 | Goto | 359/456 |
| 2004/0157141 | A1 * | 8/2004 | Ito | 430/7 |
| 2004/0217681 | A1 * | 11/2004 | Park et al. | 313/110 |
| 2005/0181234 | A1 | 8/2005 | Iida et al. | |
| 2006/0139749 | A1 * | 6/2006 | Watanabe et al. | 359/460 |
| 2006/0145578 | A1 * | 7/2006 | Park et al. | 313/112 |
| 2006/0287433 | A1 * | 12/2006 | Kanae et al. | 525/191 |

FOREIGN PATENT DOCUMENTS

| | | | |
|---|---|---|---|
| EP | 1 357 575 | | 10/2003 |
| WO | WO 2005116740 | A1 * | 12/2005 |

OTHER PUBLICATIONS

European Office Action dated Nov. 17, 2008.

* cited by examiner

*Primary Examiner* — Anne Hines
*Assistant Examiner* — Tracie Green
(74) *Attorney, Agent, or Firm* — KED & Associates, LLP

(57) ABSTRACT

A plasma display device is provided. The plasma display device includes a plasma display panel (PDP) and an external light shield sheet which absorbs external light incident upon the PDP. The external light shield sheet includes a base unit and a plurality of pattern units which are formed in the base unit. Each of the pattern units contains 2-10 weight % of light absorption particles having a size of 1 μm or less. Since the external light shield sheet which can absorb and shield as much external light as possible is disposed at the front of the PDP, the plasma display device can effectively realize black images and improve bright room contrast.

16 Claims, 9 Drawing Sheets

EXTERNAL LIGHT SHIELD SHEET AND PLASMA DISPLAY DEVICE USING THE SAME

This application claims priority from Korean Patent Application No. 10-2006-0078265 filed on Aug. 18, 2006 in the Korean Intellectual Property Office, the disclosure of which is incorporated herein by reference in its entirety.

BACKGROUND OF THE INVENTION

1. Field of the Invention

The present invention relates to a plasma display device, and more particularly, to a plasma display device in which an external light shield sheet for shielding external light incident upon a plasma display panel (PDP) is disposed at a front of the PDP so that the bright room contrast of the PDP can be improved, and that the luminance of the PDP can be uniformly maintained.

2. Description of the Related Art

In general, plasma display panels (PDPs) display images including text and graphic images by applying a predetermined voltage to a number of electrodes installed in a discharge space to cause a gas discharge and then exciting phosphors with the aid of plasma that is generated as a result of the gas discharge. PDPs are easy to manufacture as large-dimension, light, and thin flat displays. In addition, PDPs can provide wide vertical and horizontal viewing angles, full colors and high luminance.

In the meantime, external light incident upon a PDP may be reflected by an entire surface of the PDP due to white phosphors that are exposed on a lower substrate of the PDP. For this reason, PDPs may mistakenly recognize and realize black images as being brighter than they actually are, thereby causing contrast degradation.

SUMMARY OF THE INVENTION

The present invention provides a plasma display device in which an external light shield sheet for shielding external light incident upon a plasma display panel (PDP) is disposed at a front of the PDP so that the bright room contrast of the PDP can be improved, and that the luminance of the PDP can be uniformly maintained.

According to an aspect of the present invention, there is provided a plasma display device, including a PDP and an external light shield sheet which shields external light incident upon the PDP. The external light shield sheet includes a base unit and a plurality of pattern units which are formed in the base unit.

Each of the pattern units may contain 2-10 weight % of light absorption particles. The light absorption particles may be formed on the outer surfaces of the pattern units.

The refractive index of the pattern units may be 0.3-0.99 times higher than the refractive index of the base unit According to another aspect of the present invention, there is provided an external light shield sheet, including a base unit and a plurality of pattern units which are formed in the base unit, wherein each of the pattern units contains 2-40 weight % of light absorption particles.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

Figure 1:
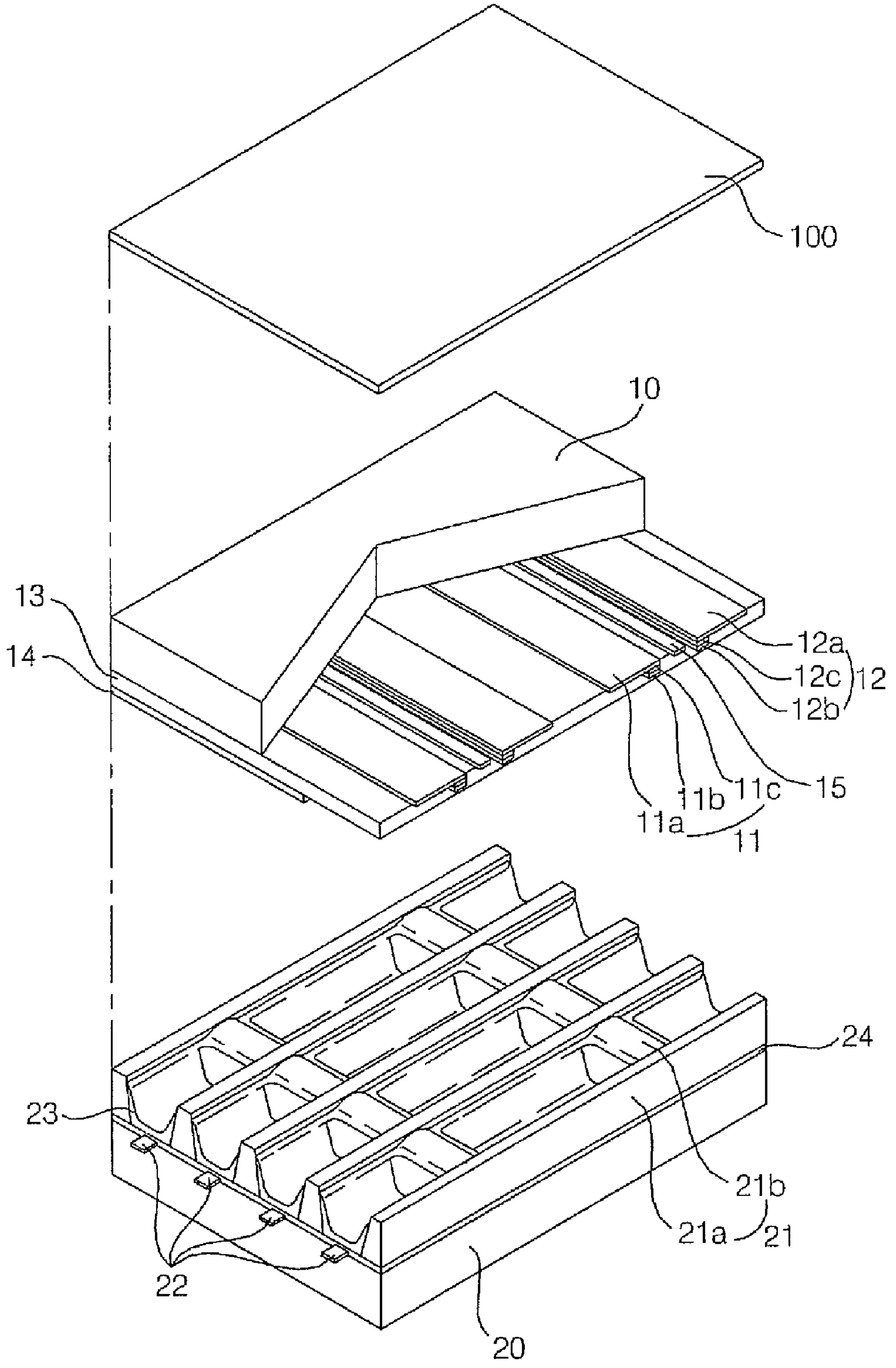
FIG. 1 is a perspective view of a plasma display panel (PDP) according to an embodiment of the present invention.

FIG. 1 is a perspective view of a plasma display panel (PDP) according to an embodiment of the present invention. Referring to FIG. 1, the PDP includes an upper substrate 10, a plurality of electrode pairs which are formed on the upper substrate 10 and consist of a scan electrode 11 and a sustain electrode 12 each; a lower substrate 20; and a plurality of address electrodes 22 which are formed on the lower substrate 20.

Each of the electrode pairs includes transparent electrodes 11*a* and 12*a* and bus electrodes 11*b* and 12*b*. The transparent electrodes 11*a* and 12*a* may be formed of indium-tin-oxide (ITO). The bus electrodes 11*b* and 12*b* may be formed of a metal such as silver (Ag) or chromium (Cr) or may be comprised of a stack of chromium/copper/chromium (Cr/Cu/Cr) or a stack of chromium/aluminium/chromium (Cr/Al/Cr). The bus electrodes 11*b* and 12*b* are respectively formed on the transparent electrodes 11*a* and 12*a* and reduce a voltage drop caused by the transparent electrodes 11*a* and 12*a* which have a high resistance.

According to an embodiment of the present invention, each of the electrode pairs may be comprised of the bus electrodes 11*b* and 12*b* only. In this case, the manufacturing cost of the PDP can be reduced by not using the transparent electrodes 11*a* and 12*a*. The bus electrodes 11*b* and 12*b* may be formed of various materials other than those set forth herein, e.g., a photosensitive material.

Black matrices are disposed on the upper substrate 10. The black matrices perform a light shied function by absorbing external light incident upon the upper substrate 10 so that light reflection can be reduced. In addition, the black matrices enhance the purity and contrast of the upper substrate 10.

In detail, the black matrices include a first black matrix 15 which overlaps a plurality of barrier ribs 21, a second black matrix 11*c* which is formed between the transparent electrode 11*a* and the bus electrode 11*b* of each of the scan electrodes 11, and a second black matrix 12*c* which is formed between the transparent electrode 12*a* and the bus electrode 12*b*. The first black matrix 15 and the second black matrices 11*c* and 12*c*, which can also be referred to as black layers or black electrode layers, may be formed at the same time and may be physically connected. Alternatively, the first black matrix 15 and the second black matrices 11c and 12c may not be formed at the same time, and may not be physically connected.

If the first black matrix 15 and the second black matrices 11c and 12c are physically connected, the first black matrix 15 and the second black matrices 11c and 12c may be formed of the same material. On the other hand, if the first black matrix 15 and the second black matrices 11c and 12c are physically separated, the first black matrix 15 and the second black matrices 11c and 12c may be formed of different materials.

An upper dielectric layer 13 and a passivation layer 14 are deposited on the upper substrate 10 on which the scan electrodes 11 and the sustain electrodes 12 are formed in parallel with one other. Charged particles generated as a result of a discharge accumulate in the upper dielectric layer 13. The upper dielectric layer 13 may protect the electrode pairs. The passivation layer 14 protects the upper dielectric layer 13 from sputtering of the charged particles and enhances the discharge of secondary electrons.

The address electrodes 22 are formed and intersects the scan electrode 11 and the sustain electrodes 12. A lower dielectric layer 24 and the barrier ribs 21 are formed on the lower substrate 20 on which the address electrodes 22 are formed.

A phosphor layer 23 is formed on the lower dielectric layer 24 and the barrier ribs 21. The barrier ribs 21 include a plurality of vertical barrier ribs 21a and a plurality of horizontal barrier ribs 21b that form a closed-type barrier rib structure. The barrier ribs 21 define a plurality of discharge cells and prevent ultraviolet (UV) rays and visible rays generated by a discharge from leaking into the discharge cells.

The present invention can be applied to various barrier rib structures, other than that set forth herein. For example, the present invention can be applied to a differential barrier rib structure in which the height of vertical barrier ribs 21a is different from the height of horizontal barrier ribs 21b, a channel-type barrier rib structure in which a channel that can be used as an exhaust passage is formed in at least one vertical or horizontal barrier rib 21a or 21b, and a hollow-type barrier rib structure in which a hollow is formed in at least one vertical or horizontal barrier rib 21a or 21b. In the differential barrier rib structure, the height of horizontal barrier ribs 21b may be greater than the height of vertical barrier ribs 21a. In the channel-type barrier rib structure or the hollow-type barrier rib structure, a channel or a hollow may be formed in at least one horizontal barrier rib 21b.

According to an embodiment of the present embodiment, red (R), green (G), and blue (B) discharge cells are arranged in a straight line. However, the present invention is not restricted to this. For example, R, G, and B discharge cells may be arranged as a triangle or a delta. Alternatively, R, G, and B discharge cells may be arranged as a polygon such as a rectangle, a pentagon, or a hexagon.

The phosphor layer 23 is excited by UV rays that are generated upon a gas discharge. As a result, the phosphor layer 23 generates one of R, G, and B rays. A discharge space is provided between the upper and lower substrates 10 and 20 and the barrier ribs 21. A mixture of inert gases, e.g., a mixture of helium (He) and xenon (Xe), a mixture of neon (Ne) and Xe, or a mixture of He, Ne, and Xe is injected into the discharge space.

Referring to FIG. 1, an external light shield sheet 100 may be disposed at the front of the PDP. The external light shield sheet 100 absorbs external light incident upon the PDP so that the external light can be prevented from being reflected toward a viewer. In addition, the external light shield sheet 100 reflects light (hereinafter referred to as panel light) emitted from the PDP toward outside the PDP so that the bright room contrast of images displayed by the PDP can be improved.

The external light shield sheet 100 may be attached onto the front of the PDP or may be disposed a predetermined distance apart from the PDP. The PDP may also include a glass filter (not shown) which is distant apart from the front of the PDP. In this case, the external light shield sheet 100 may be attached onto the glass filter.

An anti-reflection (AR) layer, a near infrared (NIR) shield sheet and an electromagnetic interference (EMI) shield sheet may be attached onto the external light shield sheet 100. If the external light shield sheet 100 is attached onto a glass filter (not shown), the AR layer, the NIR shield sheet, and the EMI shield sheet may also be attached onto the glass filter.

Figure 2A:
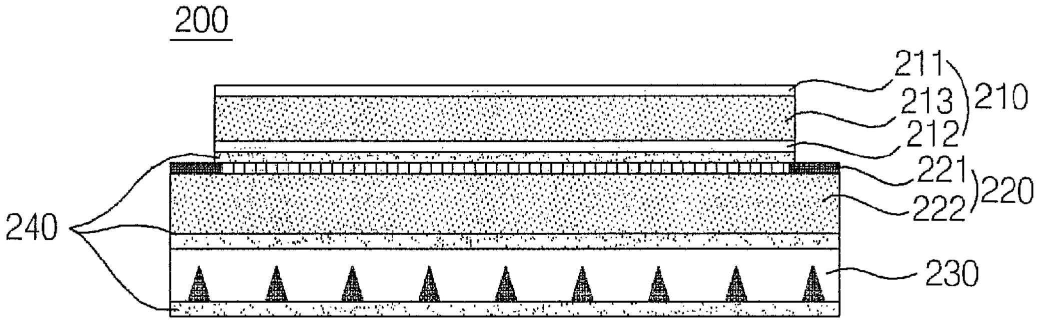
FIGS. 2A through 3B are cross-sectional views of filters to which an external light shield sheet according to an embodiment of the present invention is applied.
Figure 2B:
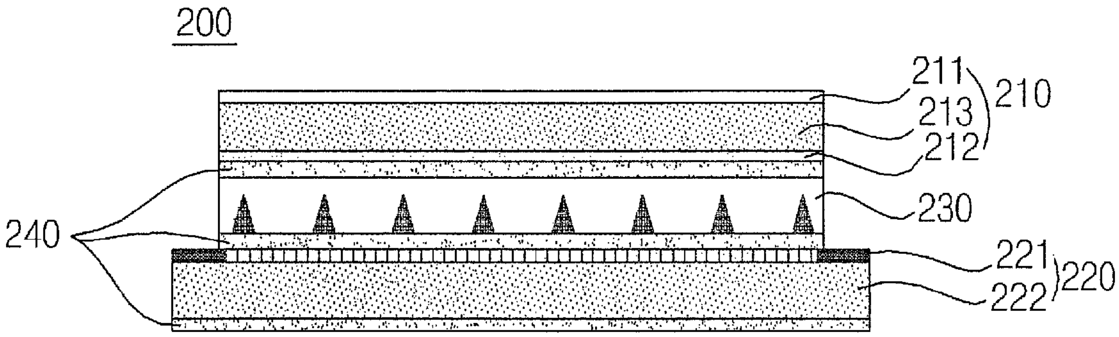
Figure 3A:
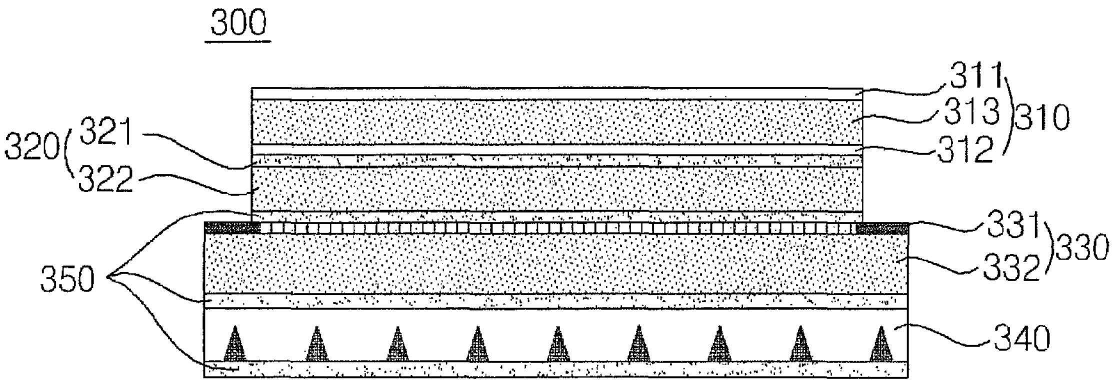
Figure 3B:
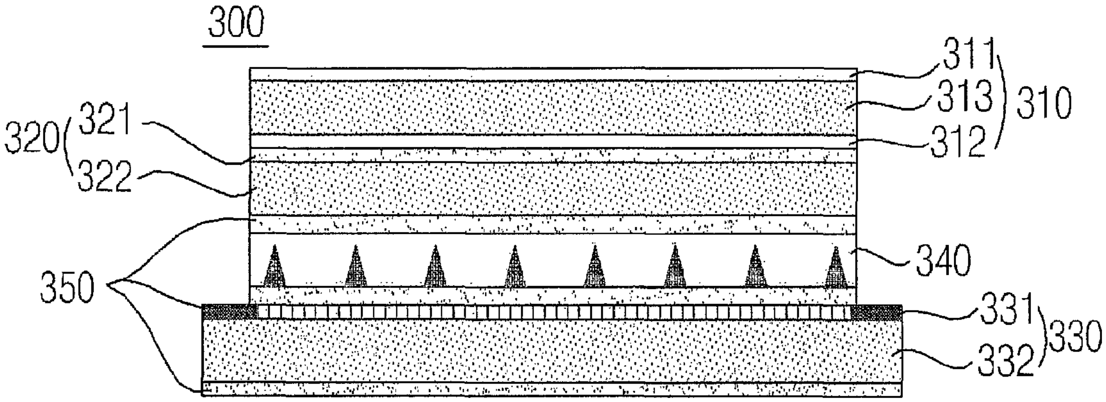

FIGS. 2A and 2B are cross-sectional views of filters 200 to which an external light shield sheet 230 according to an embodiment of the present invention is applied, and FIGS. 3A and 3B are cross-sectional views of filters 300 to which an external light shield sheet 340 according to an embodiment of the present invention is applied. A filter which is disposed at the front of a PDP may include an AR/NIR sheet, an EMI shield sheet, an external light shield sheet, and an optical sheet.

More specifically, referring to FIG. 2A, the filter 200 may include an AR/NIR sheet 210, an EMI shield sheet 220, and the external light shield sheet 230.

The AR/NIR sheet 210 includes a base sheet 213 which is formed of a transparent plastic material; an AR layer 211 which is attached onto an entire surface of the base sheet 1013 and reduces glare by preventing the reflection of external light incident upon a PDP; and an NIR shielding layer 212 which is attached onto a rear surface of the base sheet 213 and shields NIR rays emitted from a PDP so that signals provided by a device such as a remote control which transmits signals using infrared rays can be smoothly transmitted.

The EMI shield sheet 220 includes a base sheet 222 which is formed of a transparent plastic material; and an EMI shielding layer 221 which is attached onto an entire surface of the base sheet 222 and shields EMI generated by a PDP so that the EMI can be prevented from being released externally. The EMI shield sheet 221 may be formed of a conductive material as a mesh. In order to properly ground the EMI shielding layer 221, an invalid display zone on the EMI shield sheet 220 where no images are displayed may be covered with a conductive material.

An external light source is generally located over the head of a user regardless of an indoor or outdoor environment. The external light shield sheet 230 effectively shields external light so that black images can be rendered even blacker by a PDP.

An adhesive layer 240 is interposed between the AR/NIR sheet 210, the EMI shield sheet 220, and the external light shield sheet 1030 so that the filter 200 including the AR/NIR sheet 210, the EMI shield sheet 220, and the external light shield sheet 230 can be firmly attached onto a PDP. In order to facilitate the manufacture of the filter 200, the base sheets 213 and 222 may be formed of the same material.

Referring to FIG. 2A, the AR/NIR sheet 210, the EMI shield sheet 220, and the external light shield sheet 230 are sequentially deposited. Alternatively, the AR/NIR sheet 210, the external light shield sheet 230, and the EMI shield sheet 220 may be sequentially deposited, as illustrated in FIG. 2B. The order in which the AR/NIR sheet 210, the EMI shield sheet 220, and the external light shield sheet 230 are deposited is not restricted to those set forth herein. At least one of the AR/NIR sheet 210, the EMI shield sheet 220, and the external light shield sheet 230 may be optional.

Referring to FIG. 3A, the filter 300 may include an AR/NIR sheet 310, an EMI shield sheet 330, an external light shield sheet 340, and an optical sheet 320. The AR/NIR sheet 310, the EMI shield sheet 330, and the external light shield sheet 340 are the same as their respective counterparts illustrated in FIG. 2A. The optical sheet 320 enhances the color temperature and luminance properties of light incident upon a PDP from above. The optical sheet 320 includes a base sheet 322 which is formed of a transparent plastic material, and an optical sheet layer 321 which is formed of a dye and an adhesive on a front or rear surface of the base sheet 322.

At least one of the base sheets 213 and 222 illustrated in FIGS. 2A and 2B and at least one of a base sheet 313, a base sheet 312, and the base sheet 322 illustrated in FIGS. 3A and 3B may be optional. One of the base sheets 213 and 222 illustrated in FIGS. 2A and 2B and one of the base sheets 313, 312, and 322 illustrated in FIGS. 3A and 3B may be formed of such a rigid material as glass, instead of being formed of a plastic material, so that the protection of a PDP can be enhanced. Whichever of the base sheets 213 and 222 illustrated in FIGS. 2A and 2B and the base sheets 313, 312, and 322 illustrated in FIGS. 3A and 3B is formed of glass may be disposed a predetermined distance apart from a PDP.

Figure 4A:
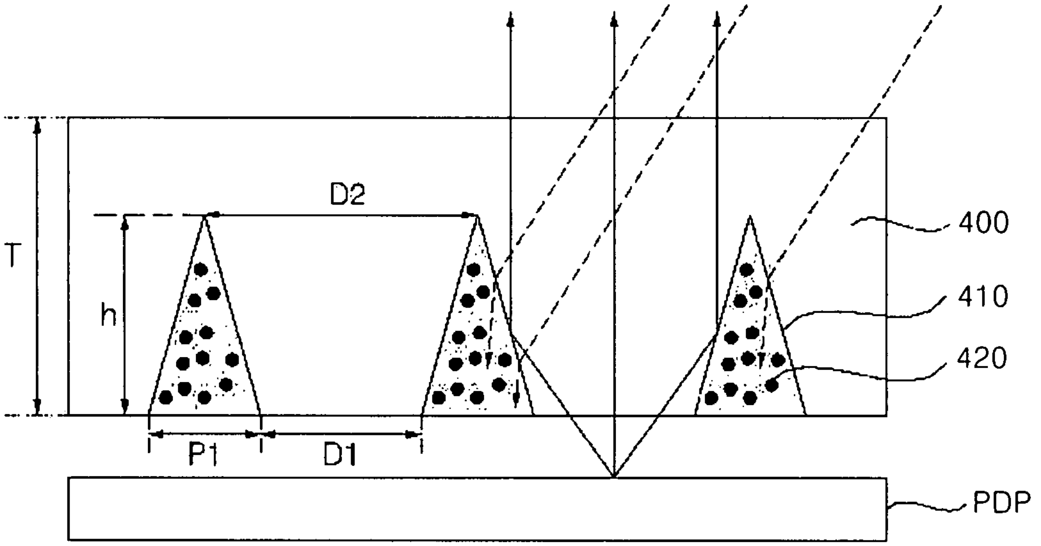
FIGS. 4A and 4B are cross-sectional views of an external light shield sheet containing light absorption particles, according to an embodiment of the present invention.
Figure 4B:
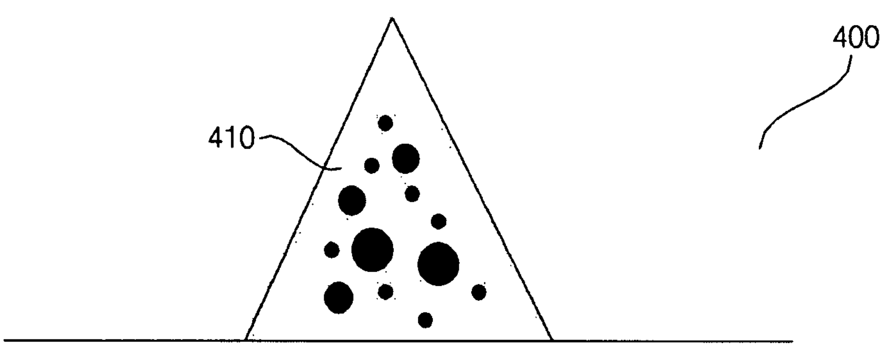

FIGS. 4A and 4B are cross-sectional views of an external light shield sheet according to an embodiment of the present invention. Referring to FIGS. 4A and 4B, the external light shield sheet includes a base unit 400 and a plurality of pattern units 410.

The base unit 400 may be formed of a transparent plastic material so that light can smoothly transmit therethrough. For example, the base unit 400 may be formed of UV-hardened resin-based material. Alternatively, the base unit 400 may be formed of a rigid material such as glass so that the protection of the front of a PDP can be enhanced.

Referring to FIG. 4A, the pattern units 410 are triangular. However, the present invention is not restricted to this. In other words, the pattern units 410 may be formed in various shapes, other than a triangular shape. The pattern units 410 may be formed of a darker material (particularly, a black material) than the base unit 400. For example, the pattern units 410 may be formed of a carbon-based material or may be dyed black so that the absorption of external light can be maximized.

Referring to FIG. 4A, each of the pattern units 410 may contain light absorption particles 420. The light absorption particles 420 may be stained resin particles. In order to maximize the absorption of light, the light absorption particles 420 may be stained black.

Each of the pattern units 410 may contain 2-40 weight % of light absorption particles 420 in order to facilitate the manufacture of the light absorption particles 420 and the insertion of the light absorption particles 420 into the pattern units 410 and to maximize the absorption of external light while preventing the efficiency of total reflection of panel light from considerably decreasing.

If the light absorption particles 420 have a size of 1 μm or more, each of the pattern units 410 may contain 10 weight % or more of light absorption particles 420.

Referring to FIG. 4A, if the light absorption particles 420 are spherical, the diameter of the light absorption particles 420 may be defined as the size of the light absorption particles 420. On the other hand, if the light absorption particle 420 are not spherical, the diameter of an circumscribed sphere of the light absorption particle 420 or an average of diameters of the light absorption particle 420 may be defined as the size of the light absorption particle 420.

The light absorption particles 420 may have different sizes, as illustrated in FIG. 4B. In this case, an average size of the light absorption particles 420 may be defined as the size of the light absorption particles 420. In other words, the light absorption particles 420 may have an average diameter of 1 μm or more.

If the size of the light absorption particles 420 is less than 1 μm, each of the pattern units 410 may contain 2-10 weight % of light absorption particles 420 in order to effectively absorb external light that is refracted by the slanted surfaces of the pattern units 410. The light absorption particles 420 may be evenly distributed in each of the pattern units 410.

In order to improve the absorption of external light, the light absorption particles 420 may be formed on the outer surfaces of the pattern units 410.

The size of the light absorption particles 420 may be 2.5-9.5 μm, and may be 0.1-0.5 times greater than the bottom width of the pattern units 410 so as to uniformly adjust the size of light absorption particles 420 during the manufacture of the light absorption particles 420, to facilitate the insertion of the light absorption particles into pattern units 410 in consideration of the width of the pattern units 410, and to evenly distribute the light absorption particles 420 in the pattern units 410 and thus enhance the absorption of light by the light absorption particles 420.

If too many light absorption particles 420 are included in the pattern units 410, the viscosity of the pattern units 410 may increase, thereby making it difficult to evenly distribute the light absorption particles 420 in the pattern units 410. If the light absorption particles 420 are not evenly distributed in the pattern units 410, some portions of the pattern units 410 may become white, and thus, the pattern units 410 may not be able to properly absorb external light incident thereupon. On the other hand, if too few light absorption particles are included in the pattern units 410, the absorption of external light by the pattern units 410 may deteriorate.

The pattern units 410 may contain 13-30 weight % of light absorption particles 420 so as to evenly distribute the light absorption particles 420 in the pattern units 410 and thus to enhance the absorption of external light.

Figure 4C:
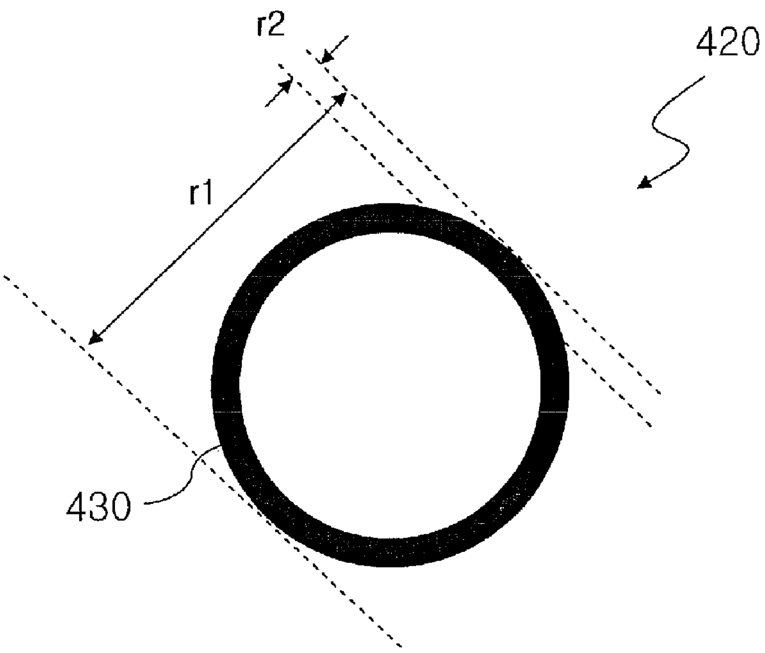
FIG. 4C is a cross sectional view of a light absorption particle according to an embodiment of the present invention.

FIG. 4C illustrates a cross section of a light absorption particle 420. Referring to FIG. 4C, a black layer 430 may be formed on the outer surface of the light absorption particle 420. In this manner, it is possible to reduce the manufacturing cost of light absorption particles, facilitate the manufacture of light absorption particles, and uniformly adjust the size of light absorption particles, compared to the situation when light absorption particles that are all dyed black or carbon particles are used.

Referring to FIG. 4C, the light absorption particle 420 may be formed in various manners. For example, the light absorption particle 420 may be formed by applying heat to a polymer-based resin particle so that the outer surface of the polymer-based resin particle can be carbonized, by dying the polymer-based resin particle black, or by forming a predetermined layer on the outer surface of the polymer-based resin particle.

A thickness r2 of the black layer 430 may be 0.05-0.2 times greater than a diameter r1 of the light absorption particle 420 so as to achieve as high a light absorption efficiency as when using light absorption particles that are dyed black, to reduce the manufacturing cost of the light absorption particle 420, and to facilitate the manufacture of the light absorption particle 420.

A refractive index of the pattern units 410, particularly, a refractive index of the slanted surfaces of the pattern units 410, may be lower than a refractive index of the base unit 400. External light which reduces the bright room contrast of a PDP is highly likely to be incident upon a PDP from above. Referring to FIG. 4A, according to Snell's law, external light that is diagonally incident upon the external light shielding sheet, as indicated by dotted lines, is refracted into and absorbed by the pattern units 410 which have a lower refractive index than a base unit 400. External light refracted into the pattern units 410 may be absorbed by the light absorption particles 420 in the pattern units 410.

Referring to FIG. 4A, panel light for displaying an image is totally reflected toward a viewer by the slanted surfaces of the pattern units 410, as indicated by solid lines.

More specifically, since the angle between panel light and the slanted surfaces of the pattern units 410 is greater than the angle between external light and the slanted surfaces of the pattern units 410, external light is refracted into and absorbed by the pattern units 410, whereas panel light is totally reflected by the pattern units 410.

In short, the external light shield sheet illustrated in FIGS. 4A and 4B can absorb external light so that external light can be prevented from being reflected toward a viewer. In addition, the external light shield sheet illustrated in FIGS. 4A and 4B can enhance the reflection of panel light so that the bright room contrast of images displayed by the PDP can be increased.

The refractive index of the pattern units 410 may be 0.3-0.99 times higher than the refractive index of the base unit 400. In this case, it is possible to maximize the absorption of external light and the total reflection of panel light in consideration of the angle at which external light is incident upon a PDP.

When the refractive index of the pattern units 410 is lower than the refractive index of the base unit 400, light emitted from a PDP is reflected by the surfaces of the pattern units 410 and thus spreads out toward the user, thereby resulting in unclear, blurry images, i.e., a ghost phenomenon.

When the refractive index of the pattern units 410 is higher than the refractive index of the base unit 400, external light incident upon the pattern units 410 and light emitted from a PDP are both absorbed by the pattern units 410. Therefore, it is possible to reduce the probability of occurrence of the ghost phenomenon.

In order to absorb as much panel light as possible and thus to prevent the ghost phenomenon, the refractive index of the pattern units 410 may be 0.05 or more higher than the refractive index of the base unit 400.

When the refractive index of the pattern units 410 is higher than the refractive index of the base unit 400, the transmissivity and contrast of an external light shield sheet may decrease. In order not to considerably reduce the transmissivity and contrast of an external light shield sheet while preventing the ghost phenomenon, the refractive index of the pattern units 410 may be 0.05-0.3 higher than the refractive index of the base unit 400. Also, in order to uniformly maintain the contrast of a PDP while preventing the ghost phenomenon, the refractive index of the pattern units 410 may be 1.0-1.3 times greater than the refractive index of the base unit 400.

A thickness T of the external light shield sheet may be 20-250 μm. In this case, it is possible to facilitate the manufacture of the external light shield sheet and optimize the transmissivity of the external light shied layer. More specifically, the thickness T may be 100-180 μm. In this case, it is possible to effectively absorb and shield external light refracted into the pattern units 410 and to enhance the durability of the external light shield sheet.

A height h of the pattern units 410 in the base unit 400 may be 80-170 μm. In this case, it is possible to effectively shield external light and prevent the pattern units 410 from being short-circuited.

A bottom width P1 of the pattern units 410 may be 18-35 μm. The slopes of the slanted surfaces of the pattern units 410 may be determined in consideration of the bottom width P1 and the height h so that the absorption of external light by the external light shield sheet can be increased, and that a sufficient aperture ratio to properly emit light generated by a PDP can be secured.

A distance D1 between the bottoms of a pair of adjacent pattern units 410 may be 40-90 μm, and a distance D2 between the tops of the pair of adjacent pattern units 410 may be 60-130 μm. In this case, it is possible to achieve a sufficient aperture ratio to display images with optimum luminance through the emission of light generated by a PDP toward a user and provide a plurality of pattern units 410 having slanted surfaces with an optimum slope for enhancing the absorption of external light and the emission of panel image light generated by a PDP. In particular, the distance D1 may be 2.5-5 times greater than the bottom width P1. In this case, it is possible to secure an optimum aperture ratio and enhance the absorption of external light and the emission of panel light.

The height h may be 1.1-2 times greater than the distance D1. In this case, it is possible to prevent external light from being incident upon a PDP and to optimize the reflection of panel light generated by the PDP.

The distance D2 may be 1.1-1.45 times greater than the distance D1. In this case, it is possible to secure a sufficient aperture ratio to display images with an optimum luminance and to enhance the total reflection of panel light by the slanted surfaces of the pattern units 410.

The height h can be varied according to the thickness T. More specifically, the height h may be within a predetermined percentage range of the thickness T. As the height h increases, the thickness of the base unit 400 decreases, and thus, dielectric breakdown is more likely to occur. On the other hand, as the height h decreases, more external light is likely to be incident upon a PDP at various angles within a predetermined range, and thus it becomes more difficult for the external light shield sheet to properly shield such external light.

Table 1 presents experimental results obtained by testing a plurality of external light shielding sheets having the same thickness T and different pattern unit heights h for whether they cause dielectric breakdown and whether they can shield external light.

TABLE 1

| Thickness (T) of External Light Shield Sheet | Height (h) of Pattern Units | Dielectric Breakdown | External Light Shield |
|---|---|---|---|
| 120 μm | 120 μm | ○ | ○ |
| 120 μm | 115 μm | Δ | ○ |
| 120 μm | 110 μm | X | ○ |
| 120 μm | 105 μm | X | ○ |
| 120 μm | 100 μm | X | ○ |
| 120 μm | 95 μm | X | ○ |
| 120 μm | 90 μm | X | ○ |
| 120 μm | 85 μm | X | Δ |
| 120 μm | 80 μm | X | Δ |
| 120 μm | 75 μm | X | X |

Referring to Table 1, when the thickness T is 120 μm and the height h is greater than 115 μm, the pattern units 410 are highly likely to dielectrically break down, thereby increasing defect rates. When the height h is less than 115 μm, the pattern units 410 are less likely to dielectrically break down, thereby reducing defect rates. When the height h is less than 85 μm, the external light shielding efficiency of the pattern units 410 is likely to decrease. When the height h is less than 75 μm, external light is likely to be directly incident upon a PDP.

When the thickness T is 1.01-2.25 times greater than the height h, it is possible to prevent the upper portions of the pattern units 410 from dielectrically breaking down and to prevent external light from being incident upon a PDP. The thickness T may be 1.01-1.35 times greater than the height h. In this case, it is possible to prevent dielectric breakdown of the pattern units 410 and infiltration of external light into a PDP, to increase the reflection of light emitted from a PDP, and to secure optimum viewing angles.

Table 2 presents experimental results obtained by testing a plurality of external light shielding sheets having different pattern unit bottom width (P1)-to-bus electrode width ratios for whether they cause the moire phenomenon and whether they can shield external light, when the width of bus electrodes that are formed on an upper substrate of a PDP is 90 μm.

TABLE 2

| Bottom Width of Pattern Units/Width of Bus Electrodes | Moire | External Light Shield |
|---|---|---|
| 0.10 | Δ | X |
| 0.15 | Δ | X |
| 0.20 | X | Δ |
| 0.25 | X | ○ |
| 0.30 | X | ○ |
| 0.35 | X | ○ |
| 0.40 | X | ○ |
| 0.45 | Δ | ○ |
| 0.50 | Δ | ○ |
| 0.55 | ○ | ○ |
| 0.60 | ○ | ○ |

Referring to Table 2, when the bottom width P1 is 0.2-0.5 times greater than the bus electrode width, the moire phenomenon can be prevented and the amount of external light incident upon a PDP can be reduced. The bottom width P1 may be 0.25-0.4 times greater than the bus electrode width. In this case, it is possible to prevent the moire phenomenon, to effectively shield external light, and to secure a sufficient opening ratio to discharge light emitted from a PDP.

Table 3 presents experimental results obtained by testing a plurality of external light shielding sheets having different pattern unit bottom width (P1)-to-vertical barrier rib width ratios for whether they cause the moire phenomenon and whether they can shield external light, when the width of vertical barrier ribs that are formed on a lower substrate of a PDP is 50 μm.

TABLE 3

| Bottom Width of Pattern Units/Top Width of Vertical Barrier Ribs | Moire | External Light Shield |
|---|---|---|
| 0.10 | ○ | X |
| 0.15 | Δ | X |
| 0.20 | Δ | X |
| 0.25 | Δ | X |
| 0.30 | X | Δ |
| 0.35 | X | Δ |
| 0.40 | X | ○ |
| 0.45 | X | ○ |
| 0.50 | X | ○ |
| 0.55 | X | ○ |
| 0.60 | X | ○ |
| 0.65 | X | ○ |
| 0.70 | Δ | ○ |
| 0.75 | Δ | ○ |
| 0.80 | Δ | ○ |
| 0.85 | ○ | ○ |
| 0.90 | ○ | ○ |

Referring to Table 3, when the bottom width P1 is 0.3-0.8 times greater than the vertical barrier rib width, the moire phenomenon can be prevented and the amount of external light incident upon a PDP can be reduced. The bottom width P1 may be 0.4-0.65 times greater than the vertical barrier rib width. In this case, it is possible to prevent the moire phenomenon, to effectively shield external light, and to secure a sufficient opening ratio to discharge light emitted from a PDP.

Figure 4D:
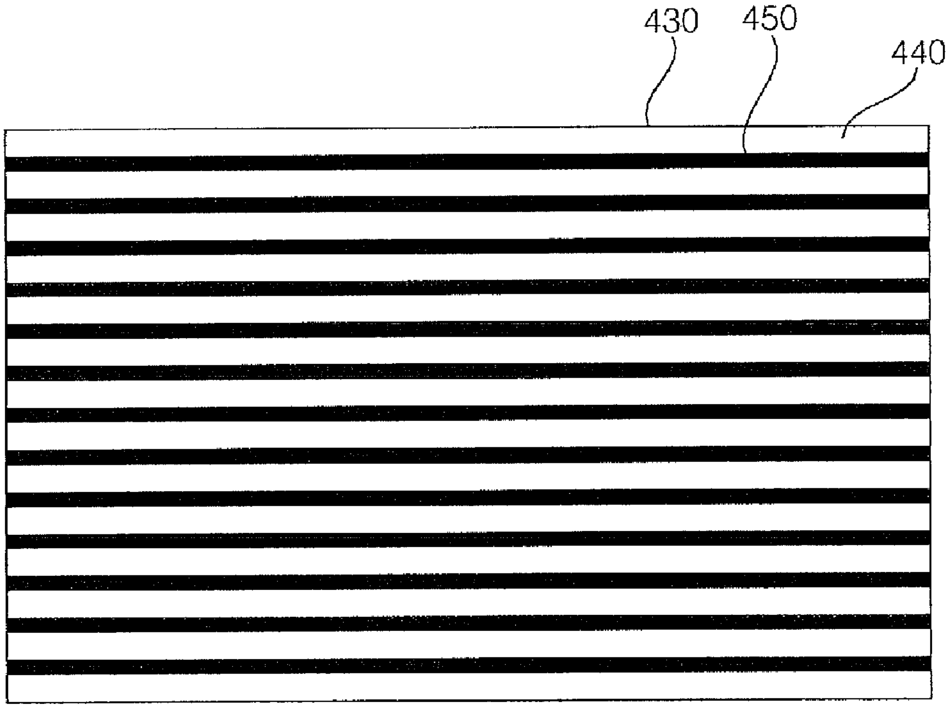
FIG. 4D is a cross-sectional view of an external light shield sheet according to an embodiment of the present invention.

FIG. 4D illustrates an external light shield sheet 430 according to an embodiment of the present invention. Referring to FIG. 4D, the external light shield sheet 430 includes a base unit 440 and a plurality of pattern units 450. The pattern units 450 are formed in the base unit 440 as stripes and have a lower refractive index than the base unit 440. In order to prevent the moire phenomenon, the pattern units 450 may be arranged diagonally with respect to the lengthwise direction of the base unit 440.

FIG. 4A illustrate the situation when the bottoms of pattern units 410 faces toward a PDP. But the bottoms of pattern units 410 may face toward a user, and the tops of pattern units 410 may face toward a PDP. In this case, external light is absorbed by the bottoms of the pattern units 410, thereby enhancing the shielding of external light. The distance between a pair of adjacent pattern units 410 may be widened compared to the distance between a pair of adjacent pattern units 410. Therefore, it is possible to enhance the aperture ratio of an external light shield sheet.

FIGS. 5A through 5F are cross-sectional views of external light shield sheets having various shapes of pattern units 510, 520, 530, 540, 550, and 560, according to embodiments of the present invention.

Figure 5A:
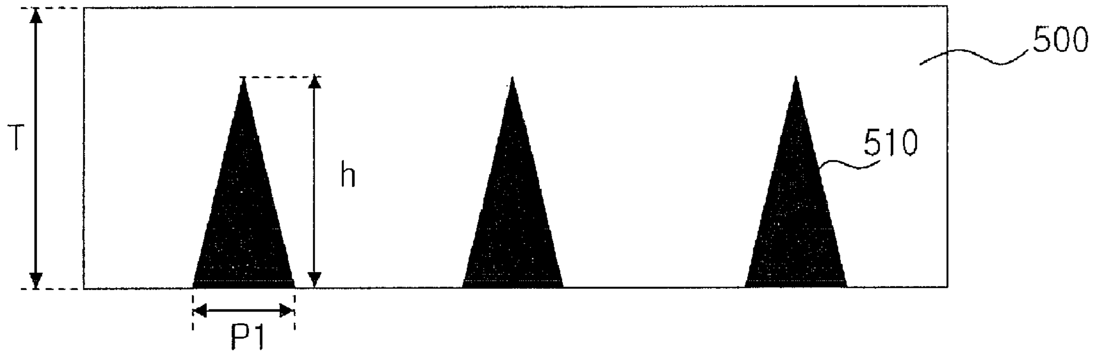
FIGS. 5A through 5F are cross-sectional views of external light shield sheets having various shapes of pattern units, according to embodiments of the present invention.
Figure 5B:
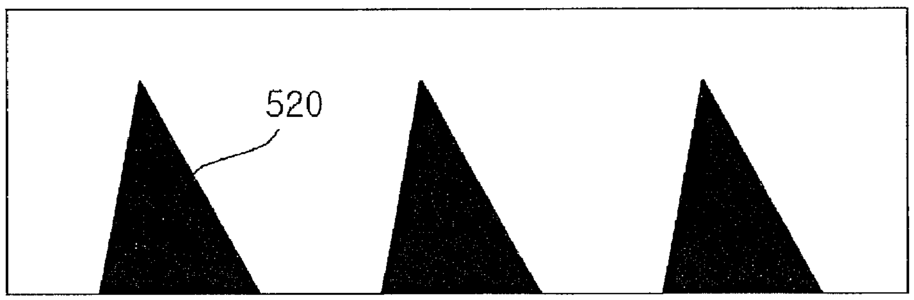

Referring to FIG. 5A, the pattern units 510 may be formed as equilateral triangles, and may be disposed so that the bases of the equilateral triangles can face toward a PDP. Referring to FIG. 5B, the pattern units 520 may be asymmetrical with respect to their respective horizontal axes. In other words, a pair of slanted surfaces of each of the pattern units 520 may have different areas or may form different angles with the bottom of an external light shield sheet.

Figure 5C:
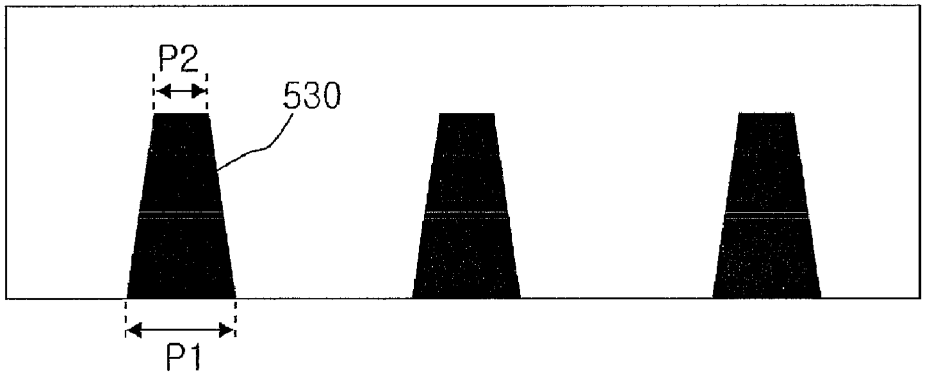

Referring to FIG. 5C, the pattern units 530 may be trapezoidal. In this case, a top width P2 of the pattern units 530 is less than a bottom width P1 of the pattern units 530.

Figure 5D:
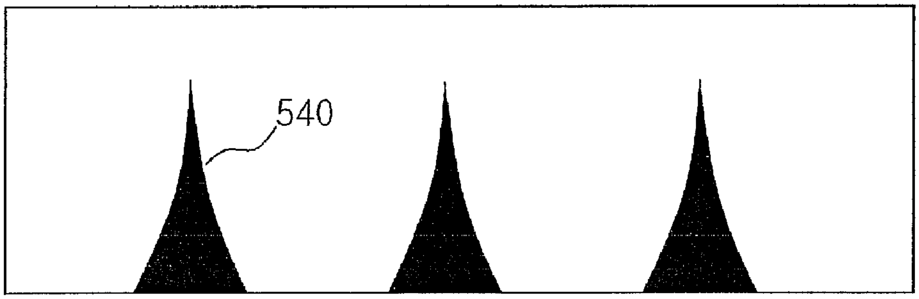
Figure 5E:
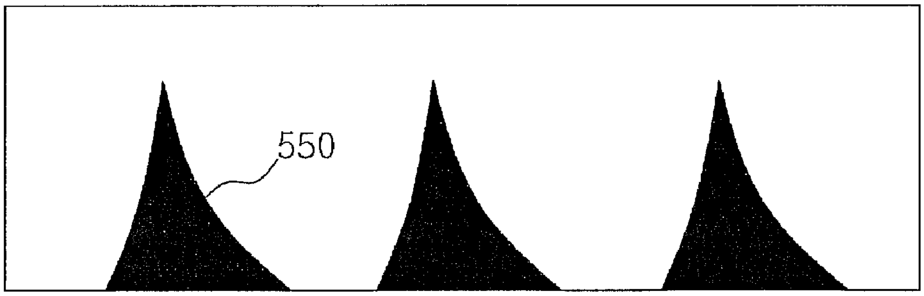
Figure 5F:
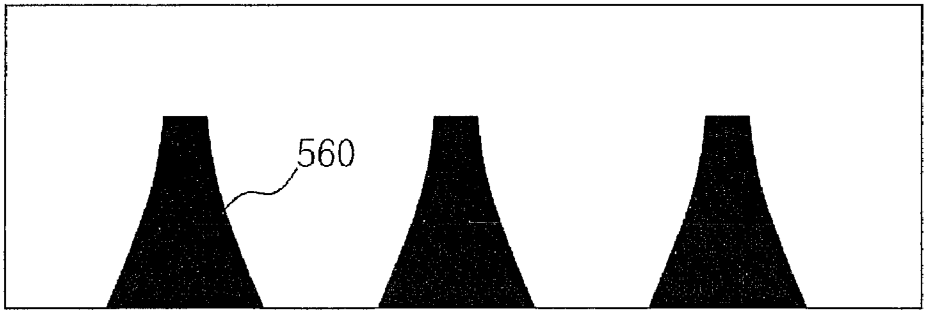

The pattern units 540, 550, and 560 illustrated in FIGS. 5D, 5E, and 5F have the same shapes as the pattern units 510, 520, and 530, respectively, illustrated in FIGS. 5A, 5B, and 5C except that the pattern units 540, 550, and 560 have curved lateral surfaces. According to an embodiment of the present invention, each of a plurality of pattern units may have a curved top or bottom surface.

Figure 6:
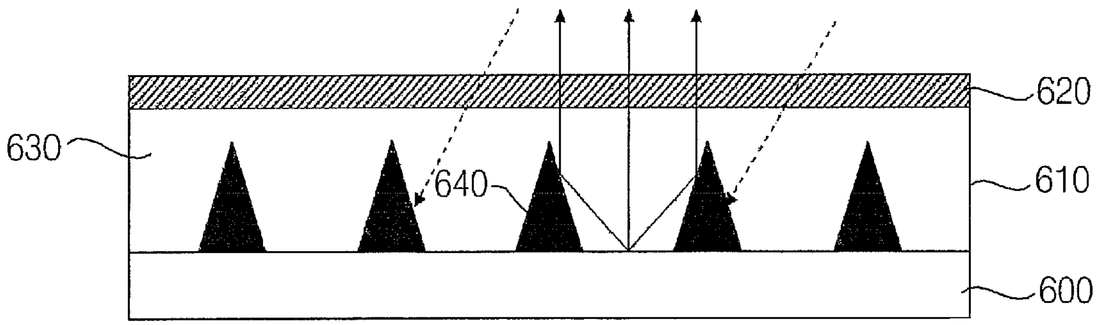
FIG. 6 is a cross-sectional view of a film filter to which an external light shield sheet according to an embodiment of the present invention is applied.

FIG. 6 is a cross-sectional view of a film filter 620 to which an external light shield sheet 610 according to an embodiment of the present invention is applied. Referring to FIG. 6, the external light shield sheet 610 may be attached onto the film filter 620 which includes an AR layer, a NIR shield layer or an EMI shield layer. Then, the film filter 620 with the external light shield sheet 610 attached thereon may be attached onto the front of a PDP 600.

Referring to FIG. 6, panel light is totally reflected by the slanted surfaces of a plurality of pattern units 640, which have a lower refractive index than a base unit 630, as indicated by solid lines, whereas external light is refracted into and then absorbed by the pattern units 640, as indicated by dotted lines.

As the ratio of the refractive index of the pattern units 640 to the refractive index of the base unit 630 decreases, more panel light is totally reflected by the slanted surfaces of the pattern units 640. The refractive index of the pattern units 640 may be 0.3-0.8 times higher than the refractive index of the base unit 630 in consideration of a vertical viewing angle of the PDP 600. In this case, it is possible to maximize the total reflection of panel light by the slanted surfaces of the pattern units 640.

Figure 7A:
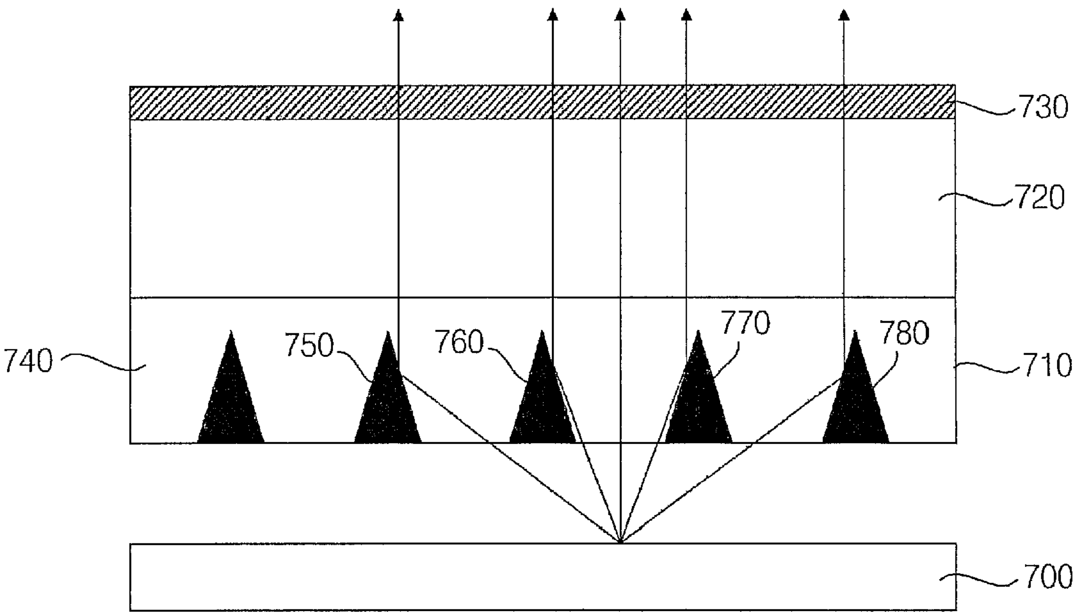
FIGS. 7A through 7C illustrate an external light shield sheet according to an embodiment of the present invention and a glass filter to which the external light shield sheet is applied.
Figure 7B:
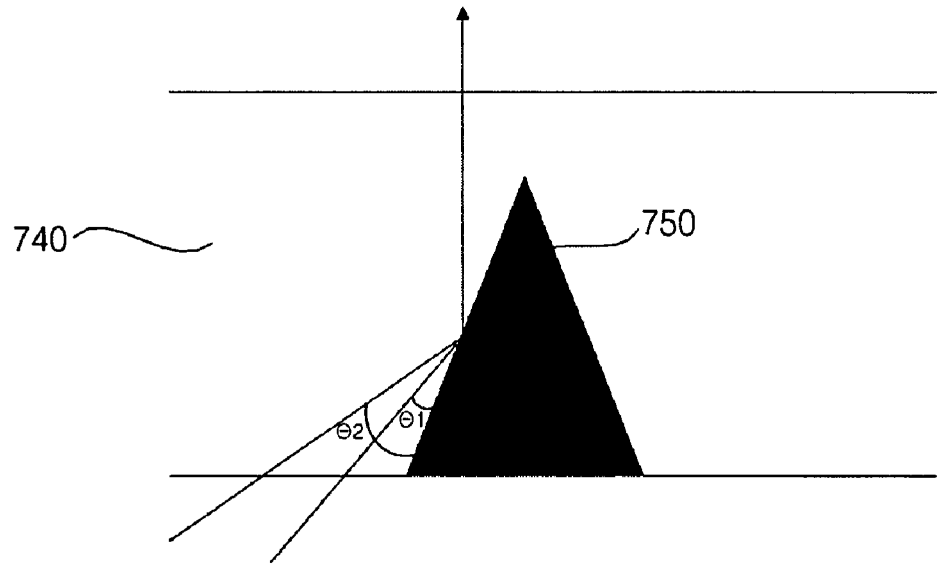
Figure 7C:
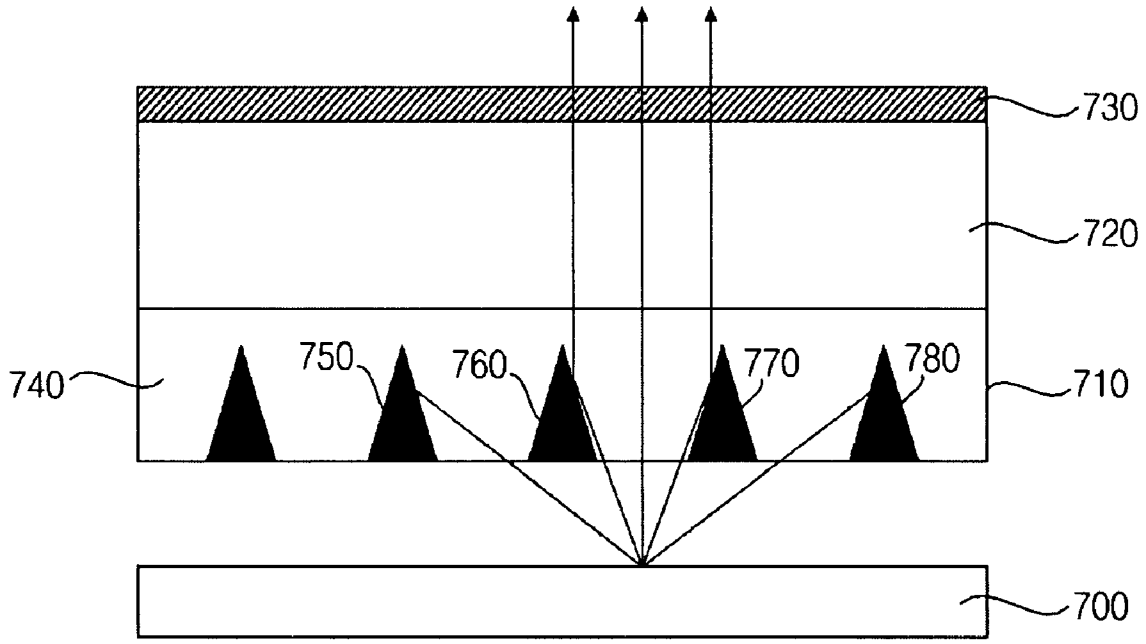

FIGS. 7A through 7C illustrate an external light shield sheet 710 according to an embodiment of the present invention and a glass filter 720 to which the external light shield sheet 710 is applied. Referring to FIGS. 7A through 7C, the external light shield sheet 710 may be attached onto the glass filter 720 which is disposed a predetermined distance apart from a PDP 700.

Referring to FIG. 7A, the external light shield sheet 710 is attached onto one surface of the glass filter 720, and an AR layer, a NIR shield layer, or an EMI shield layer 730 is attached onto the other surface of the glass filter 720.

The external light shield sheet 710 may be disposed a predetermined distance apart from the PDP 700. In this case, panel light emitted from a portion (hereinafter referred to as the light-emitting portion) of the PDP 700 is totally reflected not only by pattern units 760 and 770 that are adjacent to the light-emitting portion of the PDP 700 but also by pattern units 750 and 780 that are not as adjacent to the light-emitting portion of the PDP 700 as the pattern units 760 and 770. As a result, it may appear as if panel light is emitted not only from the light-emitting portion of the PDP 700 but also from other portions of the PDP 700, and thus, a ghost phenomenon may occur.

FIG. 7B is a cross-sectional view for explaining the relationship between the refractive indexes of a base unit 740 and the pattern unit 750 and the incidence angle of panel light. According to Snell's law, when the refractive index of the base unit 740 is reduced compared to the refractive index of the pattern unit 750, the range of incidence angles that can enable the reflection of panel light by the slanted surface of the pattern unit 750 decreases.

Referring to FIG. 7B, when the refractive index of the base unit 740 is $n_1$ and the refractive index of the pattern unit 750 is $n_2$, the range of incidence angles that can enable the reflection of panel light by the slanted surface of the pattern unit 750 is $\theta_2$. If the refractive index of the base unit 740 is reduced from $n_1$ to $n_3$, the range of incidence angles that can enable the reflection of panel light by the slanted surface of the pattern unit 750 may decrease from $\theta_2$ to $\theta_1$.

Therefore, if the refractive index of the base unit 740 is reduced compared to the refractive index of the pattern unit 750, panel light incident upon the pattern unit 750 is absorbed into the pattern unit 750, rather than being totally reflected by the slanted surface of the pattern unit 750, because of its large incidence angle.

FIG. 7C illustrates the situation when the refractive index of the base unit 740 illustrated in FIG. 7A is reduced. Referring to FIG. 7C, panel light incident upon the pattern units 750 and 780 is absorbed into the pattern units 750 and 780, rather than being totally reflected by the slanted surfaces of the pattern units 750 and 780, because the range of incidence angles that can enable the total reflection of light by the slanted surfaces of the pattern units 750 and 780 is reduced due to the reduction in the refractive index of the base unit 740. In other words, when the refractive index of the base unit 740 is reduced, panel light incident upon the pattern units 760 and 770 which are adjacent to the light-emitting portion of the PDP 700 is totally reflected by the slanted surfaces of the pattern units 760 and 770 because of its small incidence angle. On the other hand, panel light incident upon the pattern units 750 and 780 which are not as adjacent to the light-emitting portion of the PDP 700 as the pattern units 760 and 770 is absorbed into the pattern units 750 and 780 because of its large incidence angle. Therefore, it is possible to prevent panel light from scattering all over the PDP 700, and thus to prevent the ghost phenomenon.

The refractive index of the pattern units 750, 760, 770, and 780 may be determined in consideration of the distance between the panel 700 and the external light shield sheet 710 and the distance between a pair of adjacent pattern units. More specifically, the refractive index of the pattern units 750, 760, 770, and 780 may be 0.8-0.99 times higher than the refractive index of the base unit 740, thereby minimizing the probability of occurrence of the ghost phenomenon.

According to the present invention, since an external light shield sheet which can absorb and shield as much external light as possible is disposed at the front of a PDP, it is possible to effectively realize black images and improve the bright room contrast of a PDP. In addition, since a number of pattern units of an external light shield sheet contain light absorption particles, it is possible to effectively prevent the reflection of external light.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A plasma display device, comprising:

a plasma display panel (PDP); and an external light shield sheet that absorbs external light incident upon the PDP, wherein the external light shield sheet comprises:

a base unit that transmits panel light; and a plurality of pattern units that are formed in the base unit, and that absorb the external light and light emitted from the PDP, wherein each of the plurality of pattern units includes a top, a bottom wider than the top, a first inclined surface connected to the top and to the bottom and a second inclined surface connected to the top and to the bottom, wherein each of the plurality of pattern units contains 2-10 weight % of light absorption particles having an average size of 1 μm or less, wherein the light absorption particles are formed on outer surfaces of the first inclined surface and the second inclined surface, and wherein a refractive index of the pattern units is higher than a refractive index of the base unit.

2. The plasma display device of claim 1, wherein an average diameter of the light absorption particles is 1 μm or less.

3. A plasma display device, comprising:

a plasma display panel (PDP); and an external light shield sheet that absorbs external light incident upon the PDP, wherein the external light shield sheet comprises:

a base unit transmitting panel light; and a plurality of pattern units absorbing the external light and light emitted from the PDP, the pattern units formed in the base unit, the pattern unit containing 10 weight % or more of light absorption particles having a size of 1 μm or more, each of the plurality of pattern units includes a bottom, a top, a first inclined surface connected to the bottom and a second inclined surface connected to the bottom, and a bottom width of the bottom of the pattern units is greater than a top width of the top of the pattern units, wherein an average diameter of the light absorption particles is 0.1-0.5 times greater than the bottom width of the bottom of the pattern units, and wherein a refractive index of the pattern units is higher than a refractive index of the base unit.

4. The plasma display device of claim 3, wherein the light absorption particles have a size of 2.5-9.5 μm.

5. The plasma display device of claim 3, wherein an average diameter of the light absorption particles is 2.5-9.5 μm.

6. The plasma display device of claim 3, wherein the pattern unit contains 13-30 weight % of light absorption particles.

7. The plasma display device of claim 3, wherein a black layer is formed on an outer surface of the light absorption particle, and the light absorption particle is a polymer-based resin particle.

8. The plasma display device of claim 7, wherein a thickness of the black layer is 0.05-0.2 times greater than a diameter of the light absorption particle.

9. The plasma display device of claim 3, wherein the refractive index of the pattern units is 1.0-1.3 times greater than the refractive index of the base unit.

10. The plasma display device of claim 3, wherein the top of the pattern units is more adjacent to the PDP than the bottom of the pattern units.

11. The plasma display device of claim 3, wherein a thickness of the external light shield sheet is 1.01-2.25 times greater than a height of the pattern units.

12. An external light shield sheet, comprising:

a base unit transmitting panel light; and a plurality of pattern units absorbing external light that are formed in the base unit, wherein each of the plurality of pattern units includes a bottom, a top and first and second inclined surfaces that are connected to the bottom, a bottom width of the bottom of the pattern units is greater than a top width of the top of the pattern units, and the pattern unit contains 10 weight % or more of light absorption particles having an average diameter of 2.5-9.5 μm, and wherein an average diameter of the light absorption particles is 0.1-0.5 times greater than the bottom width of the pattern units, and wherein a refractive index of the pattern units is higher than a refractive index of the base unit.

13. The external light shield sheet of claim 12, wherein the pattern unit contains 13-30 weight % of the light absorption particles.

14. The external light shield sheet of claim 12, wherein a black layer is formed on an outer surface of the light absorption particle, and the light absorption particle is a polymer-based resin particle.

15. The external light shield sheet of claim 14, wherein a thickness of the black layer is 0.05-0.2 times greater than a diameter of the light absorption particle.

16. The plasma display device of claim 1, wherein the refractive index of the pattern units is 0.05-0.3 higher than the refractive index of the base unit.

* * * * *